(12) United States Patent
Kim et al.

(10) Patent No.: US 11,582,041 B2
(45) Date of Patent: Feb. 14, 2023

(54) ELECTRONIC DEVICE AND CONTROL METHOD THEREOF

(71) Applicant: SAMSUNG ELECTRONICS CO., LTD., Suwon-si (KR)

(72) Inventors: Jinsu Kim, Suwon-si (KR); Junbum Shin, Suwon-si (KR); Jungkon Kim, Suwon-si (KR); Seungtaek Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 437 days.

(21) Appl. No.: 16/776,716

(22) Filed: Jan. 30, 2020

(65) Prior Publication Data

US 2020/0266992 A1 Aug. 20, 2020

(30) Foreign Application Priority Data

Feb. 14, 2019 (KR) .................. 10-2019-0017066

(51) Int. Cl.
*H04L 29/06* (2006.01)
*H04L 9/32* (2006.01)
*H04L 9/08* (2006.01)

(52) U.S. Cl.
CPC .......... *H04L 9/3231* (2013.01); *H04L 9/0863* (2013.01); *H04L 9/0866* (2013.01)

(58) Field of Classification Search
CPC ... H04L 9/3231; H04L 9/0863; H04L 9/0866; H04L 63/083; H04L 63/0861; G06F 21/32; H04W 12/06
(Continued)

(56) References Cited

U.S. PATENT DOCUMENTS 9,613,245 B1   4/2017  Eltoft et al.
9,749,138 B2   8/2017  Mandal et al.
(Continued)

FOREIGN PATENT DOCUMENTS

JP   2000-250594   9/2000
JP   2005-275605   10/2005
(Continued)

OTHER PUBLICATIONS

Search Report and Written Opinion dated May 18, 2020 in counterpart International Patent Application No. PCT/KR2020/001405.
(Continued)

*Primary Examiner* — Evans Desrosiers
(74) *Attorney, Agent, or Firm* — Nixon & Vanderhye, P.C.

(57) ABSTRACT

An electronic device is provided. The electronic device includes a communication interface including circuitry, a memory, and a processor which, based on receiving ID information generated by performing a first encryption process on biometric information and password information generated by performing a second encryption process on the biometric information from an external electronic device through the communication interface, is configured to control the electronic device to: store the ID information and the password information in the memory. The processor, based on receiving first ID information and first password information from the external electronic device, is configured to control the electronic device to: acquire at least one candidate ID information from the memory based on the first ID information, compare password information corresponding to each of the acquired at least one candidate ID information with the first password information to identify one of the candidate ID information, and perform user authentication
(Continued)

based on the identified candidate ID information and corresponding password information.

10 Claims, 10 Drawing Sheets

(58) Field of Classification Search
USPC .......................................................... 713/184
See application file for complete search history.

(56) References Cited

U.S. PATENT DOCUMENTS

| | | |
|---|---|---|
| 9,774,596 B2 | 9/2017 | Mandal et al. |
| 9,830,495 B2 | 11/2017 | Slaby et al. |
| 2002/0174344 A1 | 11/2002 | Ting |
| 2007/0118758 A1 | 5/2007 | Takahashi et al. |
| 2007/0297653 A1 | 12/2007 | Bolle et al. |
| 2014/0185794 A1* | 7/2014 | Yasuda ................... G06F 21/32 380/28 |
| 2014/0365782 A1 | 12/2014 | Beatson et al. |
| 2015/0278495 A1* | 10/2015 | Yu ......................... H04L 9/3239 713/186 |
| 2015/0341349 A1 | 11/2015 | Mandal et al. |
| 2017/0093576 A1 | 3/2017 | Linnartz |

FOREIGN PATENT DOCUMENTS

| | | |
|---|---|---|
| JP | 2012-234235 | 11/2012 |
| KR | 10-1297118 | 8/2013 |
| KR | 10-1795701 | 11/2017 |
| KR | 10-2018-0105405 | 9/2018 |

OTHER PUBLICATIONS

Lee, Johee et al., "Instant Privacy-Preserving Biometric Authentication for Hamming Distance," Computer Science, IACR Cryptology ePrint Archive, 2018, 28 pages[retrieved 2020-050-07].
European Search Report and Written Opinion dated Nov. 29, 2021 in corresponding European Application Mo. 20755249.8.

* cited by examiner

ELECTRONIC DEVICE AND CONTROL METHOD THEREOF

CROSS-REFERENCE TO RELATED APPLICATION

This application is based on and claims priority under 35 U.S.C. § 119 to Korean patent application number 10-2019-0017066, filed on Feb. 14, 2019, in the Korean Intellectual Property Office, the disclosure of which is incorporated by reference herein in its entirety.

BACKGROUND

1. Field

The disclosure relates to an electronic device performing user authentication using biometric information, and a control method thereof.

2. Description of Related Art

In the past, in case a user is authenticated using biometric information, not only password information included in the biometric information but also separate ID information was required.

Meanwhile, in the case of a device to which an ID cannot be input, there is a problem that, input password information should be compared with all password information stored in a database, and thus it takes quite a long time for that.

Also, in the case of decrypting encrypted password information input and comparing it with the information in a database, there is a problem of a risk of exposure of biometric information.

SUMMARY

Embodiments of the disclosure address the aforementioned need. Accordingly, the disclosure provides an electronic device which performs user authentication using ID information and password information generated with input biometric information without inputting a separate ID.

An electronic device according to an example embodiment of the disclosure for achieving the aforementioned purpose includes a communication interface including circuitry, a memory, and a processor configured to control the electronic device to: store ID information and password information in the memory based on receiving ID information generated by performing a first encryption process on biometric information and receiving password information generated by performing a second encryption process on the biometric information from an external electronic device through the communication interface. The processor may be configured to control the electronic device to: acquire at least one candidate ID information from the memory based on the first ID information based on receiving first ID information and first password information from the external electronic device, and compare password information corresponding to each of the acquired at least one candidate ID information with the first password information and identify one of the candidate ID information, and perform user authentication based on the identified candidate ID information and corresponding password information.

The processor may be configured to control the electronic device to acquire the at least one candidate ID information based on similarity between each ID information stored in the memory and the first ID information, and identify one of the candidate ID information based on similarity between each password information corresponding to the at least one candidate ID information and the first password information.

Each of the ID information, the first ID information, the password information, and the first password information may include encrypted numerical information. The processor may control the electronic device to: identify ID information having a difference value from the first ID information less than or equal to a first threshold among ID information stored in the memory as the candidate ID, identify password information having a difference value from the first password information less than or equal to a second threshold among password information corresponding to the candidate ID information, and perform the user authentication based on the identified password information and corresponding candidate ID information.

In addition, the processor may be configured to control the electronic device to: perform the user authentication based on password information having a difference value that is a lowest difference value among password information having a value from the first password information less than or equal to the second threshold and corresponding candidate ID information.

The first threshold may be a value based on a Hamming distance, and the first threshold may be a value greater than the second threshold.

The first encryption may be encryption based on a bio hash, and the second encryption may be encryption based on inner-product encryption (IPE).

The biometric information may include at least one of a user's fingerprint, iris, retina, vein, voice, or face shape.

The processor may control the electronic device to: acquire the at least one candidate ID information based on the first ID information without a decryption process for the received first ID information, and compare password information corresponding to each of the at least one candidate ID information with the first password information without a decryption process for the first password information.

An electronic device according to an example embodiment of the disclosure for achieving the aforementioned purpose may include a communication interface including circuitry, and a processor configured to control the electronic device to: perform a first encryption process on biometric information based on receiving the biometric information to generate ID information and perform a second encryption process on the biometric information to generate password information, and control the communication interface to transmit the generated ID information and password information to an external server.

The first encryption may be encryption based on a bio hash, and the second encryption may be encryption based on inner-product encryption (IPE).

The biometric information may include at least one of a user's fingerprint, iris, retina, vein, voice, or face shape.

A control method according to an example embodiment of the disclosure for achieving the aforementioned purpose may include the steps of storing ID information and password information, the ID information generated by performing a first encryption process on biometric information and the password information generated by performing a second encryption process on the biometric information from an external electronic device, acquiring at least one candidate ID information from the stored ID information based on the first ID information based on receiving first ID information and first password information from the external electronic device, and comparing password information corresponding to each of the acquired at least one candidate ID information with the first password information and identifying one of the candidate ID information, and performing user authentication based on the identified candidate ID information and corresponding password information.

In the identifying one of the candidate ID information, the at least one candidate ID information may be acquired based on similarity between each stored ID information and the first ID information, and one of the candidate ID information may be identified based on similarity between each password information corresponding to the at least one candidate ID information and the first password information.

Each of the ID information, the first ID information, the password information, and the first password information may be encrypted numerical information. In the identifying one of the candidate ID information, ID information having a difference value from the first ID information is less than or equal to a first threshold may be identified among the stored ID information as the candidate ID, and password information having a difference value from the first password information less than or equal to a second threshold may be identified among password information corresponding to the candidate ID information. In the performing user authentication, the user authentication may be performed based on the identified password information and corresponding candidate ID information.

In the performing user authentication, the user authentication may be performed based on password information having a difference value that is lowest among password information having difference value from the first password information less than or equal to the second threshold and corresponding candidate ID information.

The first threshold may be a value based on a Hamming distance, and the first threshold may be a value greater than the second threshold.

The first encryption may be encryption based on a bio hash, and the second encryption may be encryption based on inner-product encryption (IPE).

The biometric information may include at least one of a user's fingerprint, iris, retina, vein, voice, or face shape.

Meanwhile, in the identifying one of the candidate ID information, the at least one candidate ID information may be acquired based on the first ID information without a decryption process for the received first ID information, and password information corresponding to each of the at least one candidate ID information may be compared with the first password information without a decryption process for the first password information.

According to the aforementioned various example embodiments of the disclosure, ID information is generated from biometric information even if a separate ID is not input for user authentication, and thus an effect that an ID is input can be achieved at a device to which an ID cannot be input.

As a separate ID is not input, user convenience is improved.

As password information is compared only among candidate ID information filtered through ID information generated from biometric information, the speed of performing user authentication is increased.

In addition, as user authentication is performed using ID information and password information encrypted without a decryption process, the risk of exposure of biometric information is decreased.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
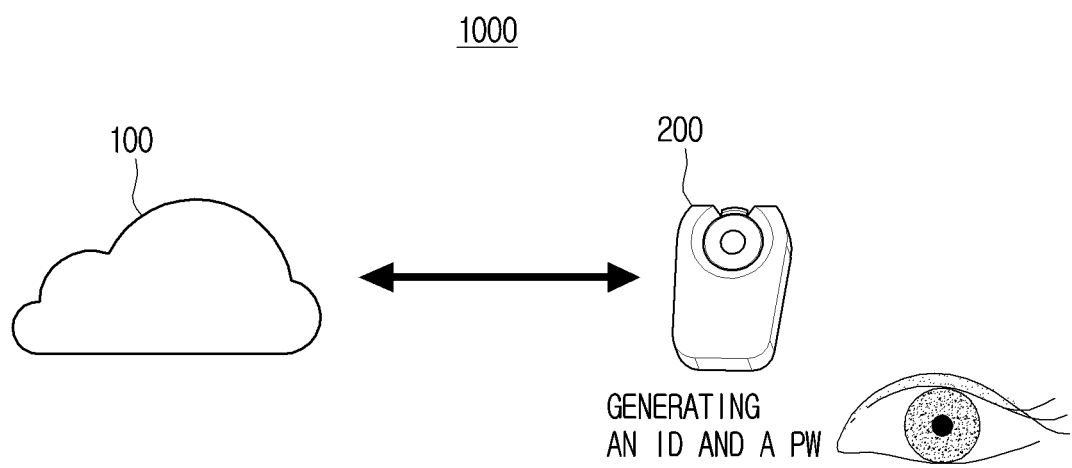
FIG. 1 is a diagram illustrating an example electronic system according to an embodiment of the disclosure.

Hereinafter, the disclosure will be described in greater detail with reference to the accompanying drawings.

The terms used in this disclosure will be described briefly, and then the disclosure will be described in greater detail.

As terms used in the various example embodiments of the disclosure, general terms that are currently used widely were selected as far as possible, in consideration of the functions described in the disclosure. However, the terms may vary depending on the intention of those skilled in the art, previous court decisions, or emergence of new technologies. Also, in some cases, there may be terms that were arbitrarily selected, and in such cases, the meaning of the terms will be apparent from the relevant descriptions in the disclosure. Thus, the terms used in the disclosure should be defined based on the meaning of the terms and the overall content of the disclosure, not just based on the names of the terms.

Various modifications may be made to the various example embodiments of the disclosure, and there may be various types of embodiments. Accordingly, example embodiments will be illustrated in drawings, and the embodiments will be described in greater detail in the detailed description. However, it should be noted that the various embodiments are not intended to limit the scope of the disclosure to a specific embodiment, but they should be interpreted to include all modifications, equivalents, or alternatives included in the ideas and the technical scope disclosed herein. Meanwhile, in case it is determined that in describing embodiments, detailed explanation of related known technologies may unnecessarily confuse the gist of the disclosure, the detailed explanation may be omitted.

Singular expressions also include plural expressions as long as they do not conflict with the context. In addition, in this disclosure, terms such as "include" and "consist of"

should be understood as designating that there are such characteristics, numbers, steps, operations, elements, components or a combination thereof described in the disclosure, but not to exclude in advance the existence or possibility of adding one or more of other characteristics, numbers, steps, operations, elements, components or a combination thereof.

Also, the expression "at least one of A and/or B" should be interpreted to refer to any one of "A" or "B" or "A and B."

In addition, the expressions "first," "second" and the like used in this disclosure may be used to describe various elements regardless of any order and/or degree of importance. Also, such expressions are used simply to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be understood to include both the case where the one element is directly coupled to the another element, and the case where the one element is coupled to the another element through still another element (e.g.: a third element).

Also, in the disclosure, "a module" or "a part" performs at least one function or operation, and may be implemented as hardware or software, or as a combination of hardware and software. Further, a plurality of "modules" or "parts" may be integrated into at least one module and implemented as at least one processor (not shown), except "modules" or "parts" which need to be implemented as specific hardware. In addition, in this specification, the term "user" may refer to a person who uses an electronic device or a device using an electronic device (e.g.: an artificial intelligence electronic device).

Hereinafter, example embodiments of the disclosure will be described in greater detail with reference to the accompanying drawings. Throughout the specification, similar components were designated by similar reference numerals.

Hereinafter, example embodiments of the disclosure will be described in greater detail with reference to the accompanying drawings.

FIG. 1 is a diagram illustrating an example electronic system according to an embodiment of the disclosure.

An electronic system 1000 includes an electronic device 100 and another electronic device 200.

The electronic device 100 may, for example, be a device that performs user authentication based on encrypted biometric information received from the another electronic device 200. For example, the electronic device 100 may be implemented as a server device that performs user authentication by comparing information previously stored in a database with encrypted biometric information received from the another electronic device 200. Biometric information may include at least one of a user's fingerprint, iris, retina, vein, voice, or face shape.

The another electronic device 200 may, for example, be a device that acquires ID information and password information by performing different encryption processes from input biometric information. For example, in the past, only password information was generated from biometric information and ID information had to be input separately, but the another electronic device 200 according to the disclosure may be a device that can acquire both ID information and password information from input biometric information.

The another electronic device 200 may be implemented in various forms as long as it is a device which includes components that can scan biometric information. For example, the another electronic device 200 may be implemented as, for example, and without limitation, a biometric information scanner, a smartphone, a tablet PC, a mobile phone, a video phone, a camera, an IR sensor device, a microphone device, a desktop PC, a laptop PC, a netbook computer, a workstation, a PDA, a portable multimedia player (PMP), an MP3 player, a medical device, a wearable device, etc., but is not limited thereto.

The another electronic device 200 may generate an ID from biometric information without a separate input of an ID and transmit the ID to the electronic device 100, and the electronic device 100 may filter ID information similar to the received ID information from a database, and perform user authentication by comparing password information corresponding to the filtered ID information with the received password information. As ID information is generated from biometric information, a separate input of ID information is not required. Accordingly, the various example embodiments of the disclosure can be applied to devices to which ID information cannot be input such as, for example, and without limitation, Internet of Things (IoT) devices like refrigerators, washing machines, etc., Augmented Reality (AR) devices, Virtual Reality (VR) devices, etc.

Compared to a case of comparing only password information without comparing ID information, in the embodiments of the disclosure, only password information of filtered ID information is compared, and thus user authentication can be performed relatively fast. Hereinafter, various example embodiments of the disclosure will be described in greater detail with reference to the accompanying drawings.

Figure 2:
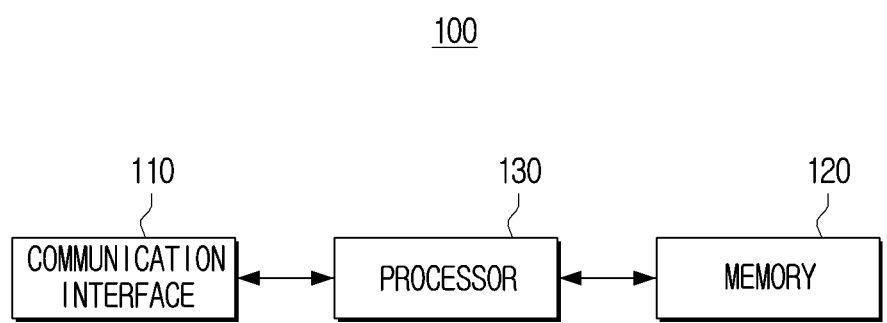
FIG. 2 is a block diagram illustrating an example operation of an electronic device according to an embodiment of the disclosure.

FIG. 2 is a block diagram illustrating an example operation of an example electronic device according to an embodiment of the disclosure.

According to FIG. 2, the electronic device 100 includes a communication interface (e.g., including communication circuitry) 110, a memory 120 and a processor (e.g., including processing circuitry) 130.

The communication interface 110 may include various communication circuitry that can transmit and receive information with an external electronic device 200. For example, the communication interface 110 may receive ID information generated by performing a first encryption process on biometric information and password information generated by performing a second encryption process on the biometric information. The communication interface 110 may transmit a result of user authentication to the external electronic device 200 under the control of the processor 130. The external electronic device 200 may be the same component as the another electronic device 200 described in FIG. 1.

The communication interface 110 may transmit and receive data with the external electronic device 200 by a wireless communication method. As an example, the communication interface 110 may use communication methods such as, for example, and without limitation, BlueTooth (BT), Wireless Fidelity (WI-FI), Zigbee, Infrared (IR), Ethernet, a Serial Interface, a Universal Serial Bus (USB), a Mobile Industry Processor Interface Camera Serial Interface (MIPI CSI), Near Field Communication (NFC), Vehicle to Everything (V2X), Cellular, etc.

The communication interface 110 may transmit and receive data with the external electronic device 200 by a wired communication method.

The memory 120 may store ID information and password information received from the external electronic device 200. ID information may, for example, be identification information for identifying a specific user, and password information is authentication information for authenticating a specific user. Corresponding password information for each ID information may exist. For example, password information 1 corresponding to ID information 1 may exist, and password information 2 corresponding to ID information 2 may separately exist.

There may be a plurality of pieces of ID information and password information stored in the memory 120. The memory 120 may store a hash function used for a bio hash.

The memory 120 may be implemented as a separate memory from the processor 130. In this example, according to the use of storing data, the memory 120 may be implemented in the form of a memory embedded in the electronic device 100, or in the form of a memory that can be attached and detached to and from the electronic device 100. For example, in the case of data for driving the electronic device 100, the data may be stored in a memory embedded in the electronic device 100, and in the case of data for an extended function of the electronic device 100, the data may be stored in a memory that can be attached and detached to and from the electronic device 100. In the case of a memory embedded in the electronic device 100, the memory may be implemented as, for example, and without limitation, at least one of a volatile memory (e.g.: a dynamic RAM (DRAM), a static RAM (SRAM), or a synchronous dynamic RAM (SDRAM), etc.) a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, a solid state drive (SSD), etc. In the case of a memory that can be attached and detached to and from the electronic device 100, the memory may be implemented in a form such as a memory card (e.g., compact flash (CF), secure digital (SD), micro secure digital (Micro-SD), mini secure digital (Mini-SD), extreme digital (xD), a multi-media card (MMC), etc.) and an external memory that can be connected to a USB port (e.g., a USB memory), etc.

The memory 120 may be implemented as an internal memory such as a ROM (e.g., an electrically erasable programmable read-only memory (EEPROM)) and a RAM included in the processor 130.

The processor 130 may include various processing circuitry and controls the overall operations of the electronic device 100.

According to an embodiment of the disclosure, the processor 130 may include various processing circuitry, such as, for example, and without limitation, a digital signal processor (DSP) processing digital signals, a microprocessor, a time controller (TCON), or the like. However, the disclosure is not limited thereto, and the processor 130 may include, for example, and without limitation, one or more of a central processing unit (CPU), a micro controller unit (MCU), a micro processing unit (MPU), a controller, an application processor (AP), a dedicated processor, a communication processor (CP), an ARM processor, or the like. The processor 130 may be implemented as a system on chip (SoC) having a processing algorithm stored therein or large scale integration (LSI), or in the form of a field programmable gate array (FPGA). The processor 130 may perform various functions by executing computer executable instructions stored in the memory 120.

The processor 130 may receive ID information generated by performing a first encryption process on biometric information and password information generated by performing a second encryption process on the biometric information from the external electronic device 200 through the communication interface 110.

The first encryption may be encryption based on a bio hash, and the second encryption may be encryption based on inner-product encryption (IPE).

For example, ID information may refer, for example, to a hash value output by inputting biometric information into a hash function stored in the memory 120, and it may be a bit value wherein numbers are listed. As a value output through a hash function cannot be restored to an input value, biometric information of a user can be protected. If a hash function is used, the same hash value is always output for the same input. Thus, ID information based on a hash function can be used in user authentication.

IPE is a kind of function encryption, and is an encryption system which can calculate an inner product value of a vector in an encrypted state. Accordingly, password information may be encrypted based on the same biometric information used for ID information.

For example, ID information and password information are generated from one biometric information, and ID information and password information may be encrypted numerical information.

When ID information and password information are received from the external electronic device 200, the received ID information and password information may be stored in the memory 120. Each of the at least one ID information may be stored together with corresponding password information. Here, the step of storing the received ID information and password information in the memory 120 may be a step of constructing a database for user authentication. For example, ID information stored in the memory 120 is ID information of a user subscribing to a service related to the electronic device 100, and for example, in the case of subscribing to the service or in the case of trying to perform user authentication using biometric information, ID information and password information may be received from the external electronic device 200, and the electronic device 100 may store the received ID information and password information in the memory 120.

First ID information and first password information may be received at the electronic device 100 from the external electronic device 200, and this step may be a step for user identification and authentication. For example, first ID information and first password information are information for user identification and authentication, and may be encrypted numerical information.

When first ID information and first password information are received from the external electronic device 200, the processor 130 may acquire at least one candidate ID information from the memory 120 based on the first ID information.

For example, the processor 130 may acquire at least one candidate ID information based on similarity between each ID information stored in the memory 120 and the first ID information. As described above, for first encryption based on a bio hash, a hash function is used, and in a hash function, the same hash value (ID information) is always output for the same input value, but biometric information corresponding to an input value may be input differently for every case of performing scanning. For example, in case fingerprint information is used as biometric information, biometric information may be input differently according to the pressure of the finger or the tilt of the finger contacting the fingerprint scanner. Accordingly, the processor 130 may acquire candidate ID information having similar ID information, rather than searching ID information identical to the received first ID information in the memory 120.

For example, the processor 130 may identify ID information of which difference value from the first ID information is less than or equal to a first threshold among ID information stored in the memory 120 as the candidate ID. The difference between the ID information stored in the memory 120 and the first ID information may refer, for example, to a difference based on a Hamming distance. A Hamming distance may refer, for example, to the number of cases wherein bit values among information having the same bit numbers are not identical.

For example, the difference between the ID information stored in the memory 120 and the first ID information may be the number of bit values that are different between them. A more detailed explanation in this regard will be made below with reference to FIG. 5.

Figure 5:
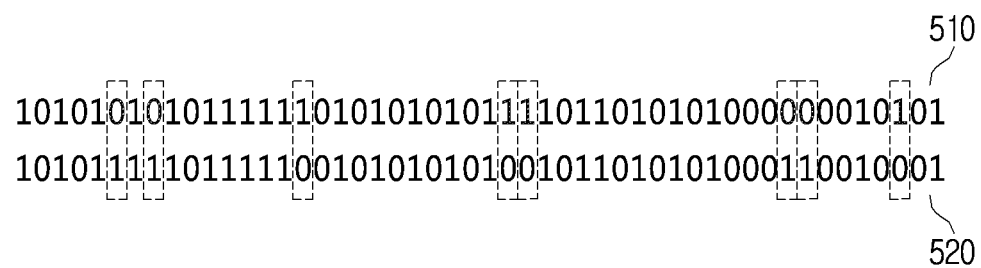
FIG. 5 is a diagram illustrating an example difference between ID information based on a Hamming distance according to an embodiment of the disclosure.

FIG. 5 is a diagram illustrating an example difference between ID information based on a Hamming distance according to an embodiment of the disclosure.

FIG. 5 is a diagram illustrating ID information 510 stored in the memory 120 and the received first ID information 520.

Each of the ID information 510 and the received first ID information 520 may be a hash value output as biometric information was input into a hash function as an input value, and it may be expressed as a bit value wherein numbers are listed. As in FIG. 5, the ID information 510 and the received first ID information 520 may have the same bit numbers.

The processor 130 may acquire ID information similar to the received first ID information 520 as candidate ID information from the memory 120. Similarity may be determined based on the difference value from the first ID information among ID information stored in the memory 120. For example, the processor 130 may identify ID information of which difference value from the first ID information is less than or equal to a first threshold among ID information stored in the memory 120 as the candidate ID. The first threshold may be a value based on a threshold regarding the number of different bit values, e.g., a Hamming distance. For example, in case the first threshold is set as 10, the processor 130 may acquire ID information wherein the number of bit values different from the first ID information is less than or equal to 10 among ID information stored in the memory 120 as the candidate ID.

As an example, in FIG. 5, the number of bit values different between the received first ID information 520 and specific ID information stored in the memory 120 is 8, and thus the number falls under a case of being less than or equal to a first threshold, and accordingly, the ID information 520 may become the candidate ID information of the first ID information 510.

Returning to FIG. 2, the processor 130 may compare password information corresponding to each of the acquired at least one candidate ID information with the first password information and identify one of the candidate ID information. For example, the processor 130 compares password information within at least one ID information filtered as the candidate ID information, and thus the processor 130 can identify ID information corresponding to the first ID information relatively fast.

For example, the processor 130 may identify one of the candidate ID information based on similarity between each password information corresponding to the at least one candidate ID information and the first password information. Similarity may be determined based on the difference value from the first password information among password information corresponding to the candidate ID information. For example, similarity may refer, for example, to the number of numerical values different among password information as in FIG. 5.

For example, in case 100 pieces of ID information are stored in the memory 120, and 10 pieces of candidate ID information were acquired according to the similarity to the first ID information, the processor 130 may compare password information corresponding to each of the 10 pieces of candidate ID information with the received first password information.

The processor 130 may identify password information of which difference value from the first password information is less than or equal to a second threshold among password information corresponding to the candidate ID information.

For example, in case the second threshold is set as 5, the processor 130 may identify password information wherein the number of values different from password information corresponding to the candidate ID information is less than or equal to 5, and identify ID information corresponding to the identified password information.

The processor 130 may perform user authentication based on the identified password information and corresponding candidate ID information. For example, in case one ID information was identified through comparison of password information, the processor 130 may perform user authentication that the identified ID information and the first ID information are the same user. The processor 130 may transmit the result of user authentication to the external electronic device 200.

In case candidate ID information of which difference value from the first ID information is less than or equal to a first threshold is not identified or password information wherein the difference value between password information is less than or equal to a second threshold among candidate ID information is not identified, the processor 130 may identify that a user who coincides with the first ID information does not exist in the memory 120. In this case, the processor 130 may also transmit a result that a user who coincides with the first ID information does not exist to the external electronic device 200.

In case there are a plurality of pieces of password information of which difference values from the first password information are less than or equal to a second threshold, the processor 130 may perform user authentication by identifying password information of which difference value from the first password information is the lowest, and identifying ID information corresponding thereto. For example, a case wherein 10 pieces of candidate ID information are acquired, and three pieces of password information of which difference values from the first password information are less than or equal to a second threshold (as an example, 5) are acquired is assumed. In this case, the processor 130 may perform user authentication by identifying password information of which difference from the first password information is minimum among the three pieces of password information and identifying ID information corresponding thereto as ID information that coincides with the first ID information.

A first threshold may be a value greater than a second threshold. As ID information is information used for performing filtering of ID information stored in the memory 120 for user identification prior to user authentication performed using password information, a first threshold used for acquiring candidate ID information may be a value greater than a second threshold. In case a first threshold is set as a small value, the number of acquired candidate ID information may relatively be reduced, and user ID information corresponding to the first ID information may not be included in the candidate ID information.

Password information is for user authentication, and comparison between password information falls under a final step of user authentication. Thus, in case a second threshold is set as a big value, a plurality of passwords may be identified. Accordingly, a second threshold needs to be set as a relatively small value.

A first threshold may be changed based on the preset number of candidate ID information. For example, a case wherein the preset number is set as 10 is assumed. In this case, if the number of candidate ID information which is acquired in case the first threshold is 10 is 50, the processor 130 may reduce the first threshold to less than 10. Accordingly, the number of candidate ID information acquired may be close to 10.

A second threshold may be changed based on the preset number of identified password information. For example, a case wherein the preset number is set as 1 is assumed. In this case, if the number of password information which is acquired in case the second threshold is 5 is 3, the processor 130 may reduce the second threshold to less than 5.

The number of numbers expressed as ID information and the number of numbers expressed as password information are different. Thus, depending on cases, a second threshold may be a greater value than a first threshold.

The aforementioned biometric information may include at least one of a user's fingerprint, iris, retina, vein, voice, or face shape. For example, in case a user's fingerprint is used as biometric information, if the user's fingerprint is input through a scanner, the external electronic device 200 may perform bio hash processing on the user's fingerprint information and acquire ID information having a present number of bits.

The processor 130 may acquire at least one candidate ID information based on the first ID information without a decryption process on the received first ID information. The processor 130 may compare password information corresponding to each of the at least one candidate ID information with the first password information without a decryption process for the first password information. For example, the processor 130 may compare only a bit value corresponding to ID information with a bit value corresponding to the first ID information without a separate decryption process and acquire candidate ID information. Thus, according to an embodiment of the disclosure, candidate ID information can be acquired faster than the case of comparing ID information through decryption, and for the same reason, password information similar to the first password information can be identified faster than the case of comparing password information through decryption.

The electronic device 100 may not have a secret key for which a first encryption process was performed on biometric information for generating ID information, and may not have a secret key for which a second encryption process was performed on biometric information for generating password information, and thus biometric information can be protected safely. This is for the reason that, even if the electronic device 100 is hacked, for example, there are no secret key for which a first encryption process was performed and no secret key for which a second encryption process was performed, and thus exposure of biometric information of a user can be prevented.

Figure 3:
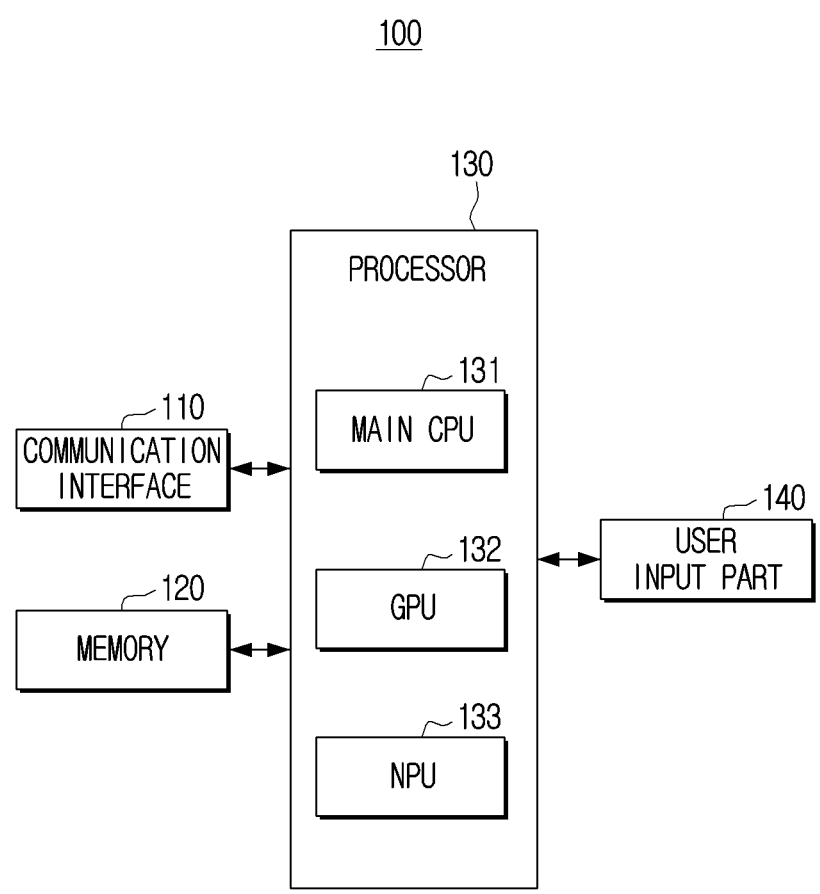
FIG. 3 is a block diagram illustrating an example configuration of an electronic device according to an embodiment of the disclosure.

FIG. 3 is a block diagram for illustrating an example configuration of an electronic device according to an embodiment of the disclosure.

According to FIG. 3, the electronic device 100 includes a communication interface (e.g., including communication circuitry) 110, a memory 120, a processor (e.g., including processing circuitry) 130, and a user input part (e.g., including input circuitry) 140. Among the components illustrated in FIG. 3, regarding parts that overlap with the components illustrated in FIG. 2, detailed explanation may not be repeated here.

The communication interface 110 may include various communication circuitry that can communicate with the external electronic device 200. The communication interface 110 may include various modules including various communication circuitry, such as, for example, and without limitation, a WI-FI module (not shown), a Bluetooth module (not shown), a Local Area Network (LAN) module (not shown), a wireless communication module (not shown), etc. Each communication module may be implemented in the form of at least one hardware chip. A wireless communication module may include at least one communication chip including communication circuitry that performs communication according to various wireless communication standards such as, for example, and without limitation, Zigbee, Ethernet, a Universal Serial Bus (USB), a Mobile Industry Processor Interface Camera Serial Interface (MIPI CSI), 3rd Generation (3G), a 3rd Generation Partnership Project (3GPP), Long Term Evolution (LTE), LTE Advanced (LTE-A), 4th Generation (4G), 5th Generation (5G), etc. other than the aforementioned communication methods. However, this is merely an example, and the communication interface 110 may use at least one communication module among various communication modules.

The processor 130 may include various processing circuitry and controls the overall operations of the electronic device 100 using various types of programs stored in the memory 120. The processor 130 may include a graphic processing unit 132 for graphic processing corresponding to an image. The processor 130 may be implemented as a System On Chip (SoC) including a core (not shown) and a GPU 132. In addition, the processor 130 may include a single core, a dual core, a triple core, a quad core, and a core of a multiple thereof.

The processor 130 may include, for example, a main CPU 131, a GPU 132, and an NPU 133.

The main CPU 131 accesses the memory 120, and performs booting using the O/S stored in the memory 120. The main CPU 131 performs various operations using various types of programs, content data, etc. stored in the memory 120. In particular, according to an embodiment of the disclosure, the main CPU 131 may copy a program in the memory 120 to a RAM according to a command stored in a ROM, and access the RAM and execute the program.

The GPU 132 may be a processing device of a high performance for graphic processing, and may be a specialized electronic circuit designed to accelerate generation of an image in a frame buffer that will process the memory swiftly and change it, and output it on a screen. The GPU 132 may refer, for example, to a visual processing unit (VPU).

The NPU 133 may be an AI chipset (or an AI processor), and it may also be an AI accelerator. The NPU 133 may be a processor chip optimized for performing a deep neural network. The NPU 133 may be a processing device that executes a deep learning model instead of the GPU 132, and the NPU 133 may also be a processing device that executes a deep learning model together with the GPU 132.

The user input part 140 may include various input circuitry for receiving input of various kinds of user commands and information. The processor 130 may execute a function corresponding to a user command input through the user input part 140, or store information input through the user input part 140 in the memory 120.

The user input part 140 may receive input of information for a first threshold and a second threshold from a user.

The user input part 140 may include, for example, and without limitation, a microphone (not shown) for receiving a user command in the form of a voice, a display (a touch screen) for receiving input of a user command as a touch, or the like.

The display may be implemented in the form of a touch screen that includes an interlayer structure with a touch pad. A touch screen may be such that it can detect not only a location and an area of a touch input, but also the pressure of a touch input.

The user input part 140 may receive input of a signal including information for a user command or an operation from a separate control device (not shown) for controlling the electronic device 100.

Figure 4:
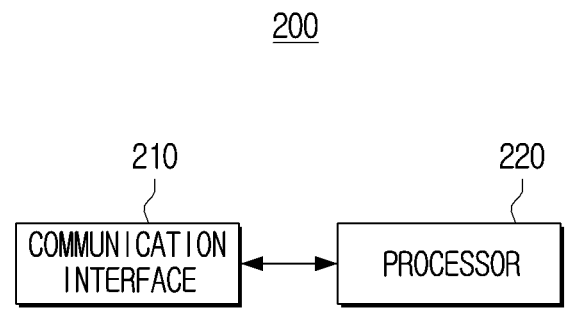
FIG. 4 is a block diagram illustrating an example operation of another electronic device according to an embodiment of the disclosure.

FIG. 4 is a block diagram illustrating an example operation of another electronic device according to an embodiment of the disclosure.

According to FIG. 4, the another electronic device 200 includes a communication interface (e.g., including communication circuitry) 210 and a processor (e.g., including processing circuitry) 220.

The communication interface 210 may include various communication circuitry to transmit ID information and password information generated from biometric information to the electronic device 100. The communication interface 210 may receive a result of user authentication from the electronic device 100.

An example embodiment wherein the communication interface 210 is implemented may be identical to or similar to the embodiment of the communication interface 110 in FIG. 2. Thus, detailed explanation may not be repeated here.

The processor 220 may include various processing circuitry and controls the overall operations of the another electronic device 200.

An embodiment wherein the processor 220 is implemented may also be identical to the embodiment of the processor 130 in FIG. 2. Thus, detailed explanation may not be repeated here.

According to an embodiment of the disclosure, when biometric information is input, the processor 220 may generate ID information by performing a first encryption process on the biometric information and generate password information by performing a second encryption process on the biometric information. For example, the processor 220 may generate ID information by encrypting biometric information based on a first secret key, and generate password information by encrypting biometric information based on a second secret key. The first and second secret keys may be keys that encrypt biometric information input to the electronic device 200, and are not transmitted to an external server 100. Each of the first and second secret keys may be the same key in the same type of electronic device 200. For example, in case the electronic device 200 is implemented as a biometric information scanner arranged in a convenience store, the biometric information scanner arranged in each convenience store should include the same secret key. Accordingly, no matter at which point a user visits a convenience store, the same or similar ID information and password information may be generated from biometric information.

First encryption may be encryption based on a bio hash, and second encryption may be encryption based on inner-product encryption (IPE).

For example, the processor 220 may generate ID information and password information by performing different types of encryption processing from one piece of biometric information. In other words, identification information corresponding to an ID may be generated only with biometric information without a separate input of an ID. Accordingly, embodiments according to the disclosure can be applied to devices to which ID information cannot be input, for example, Internet of Things (IoT) devices like refrigerators, washing machines, etc., Augmented Reality (AR) devices, Virtual Reality (VR) devices, etc.

The processor 220 may control the communication interface 210 to transmit the generated ID information and password information to the external server 100.

ID information and password information generated from biometric information may be transmitted to the external server 100 as user information for constructing a database of the external server 100, or transmitted to the external server 100 as information for user authentication after construction of a database.

For example, ID information and password information generated from biometric information may be ID information and password information (construction of a database) or first ID information and first password information (user authentication) received at the electronic device 100 in FIG. 2. As explanation in this regard was made with reference to FIG. 2 above, detailed explanation may not be repeated here.

Biometric information may include at least one of a user's fingerprint, iris, retina, vein, voice, or face shape. For example, in case a user's fingerprint is used as biometric information, if the user's fingerprint is input through a scanner, the processor 220 may perform bio hash processing on the user's fingerprint information and acquire ID information having a present number of bits.

The another electronic device 200 may additionally include a camera (not shown), a microphone (not shown), and an IR sensor (not shown) for receiving input of biometric information.

The camera may, for example, include a component for acquiring at least one of iris, retina, or face shape information. The camera may transmit at least one of iris, retina, or face shape information acquired through a lens to the processor 220. In this case, the processor 220 may process at least one of the iris, retina, or face shape information received from the camera as a digital signal. Afterwards, the processor 220 may generate ID information and password information by performing a first encryption process and a second encryption process on the biometric information processed as a digital signal. Alternatively, the camera may directly process at least one of the acquired iris, retina, or face shape information as a digital signal and transmit it to the processor 220.

The microphone may, for example, include a component for acquiring voice information, and the IR sensor is a component for acquiring vein information. The microphone and the IR sensor may transmit each of the acquired voice information and vein information to the processor 220. The processor 220 may process the received voice information and vein information as digital signals and acquire biometric information. However, the disclosure is not limited thereto, and the microphone and the infrared (IR) sensor may directly process each of the acquired voice information and vein information as a digital signal and transmit the signals to the processor 220.

Figure 6:
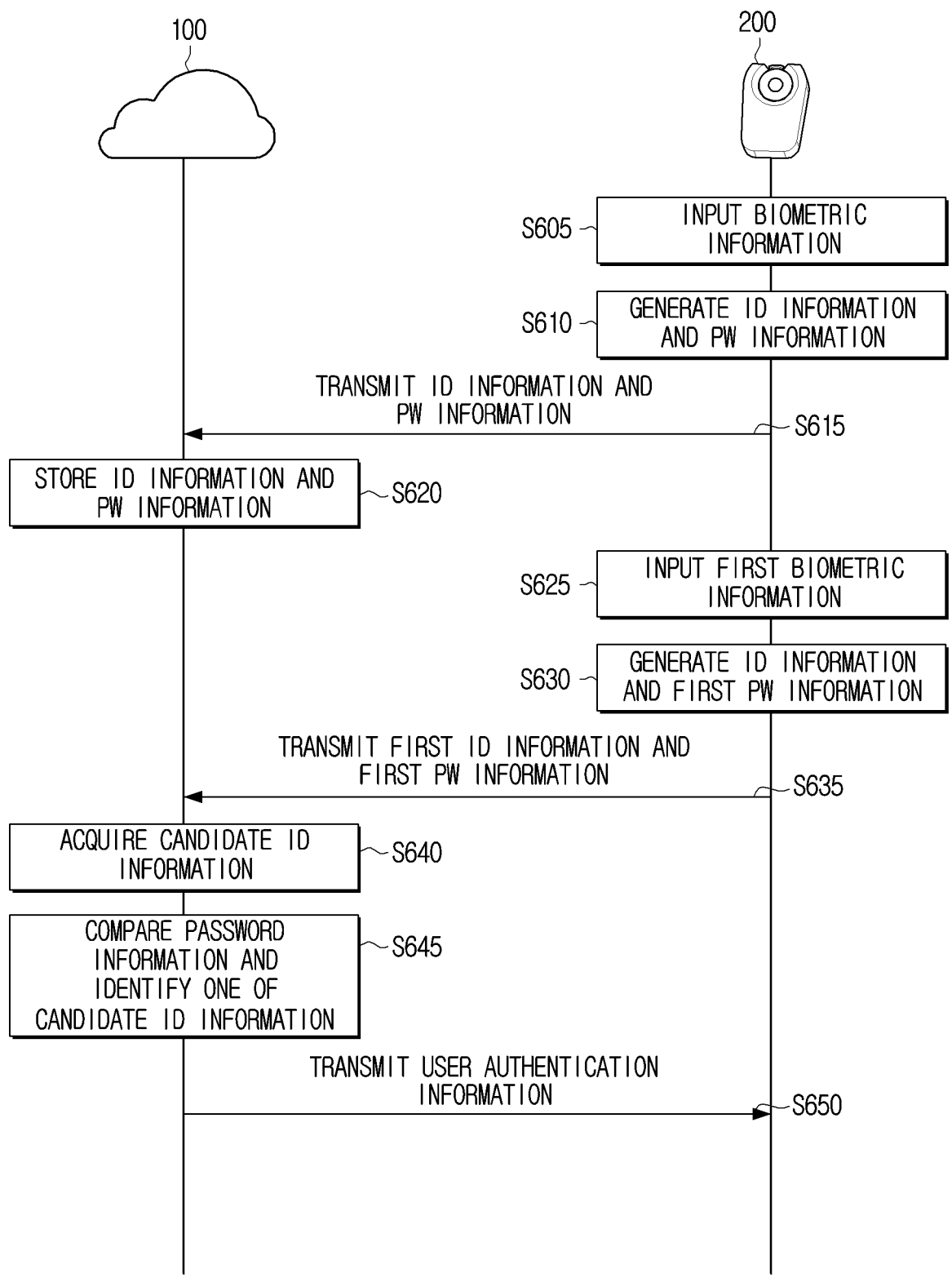
FIG. 6 is a sequence diagram illustrating example operations of an electronic device and another electronic device according to an embodiment of the disclosure.

FIG. 6 is a sequence diagram illustrating example operations of an example electronic device and another electronic device according to an embodiment of the disclosure.

The another electronic device 200 may receive input of biometric information including at least one of a fingerprint, an iris, a retina, a vein, a voice, or a face shape from a user at operation S605.

The another electronic device 200 may generate ID information by performing a first encryption process on the input biometric information, and generate password information by performing a second encryption process on the biometric information at operation S610.

The another electronic device 200 may transmit the generated ID information and password information to the electronic device 100 at operation S615.

The electronic device 100 may store the ID information and password information transmitted from the another electronic device 200 as a database at operation S620.

The aforementioned operations S605, S610, S615 and S620 may be a process of constructing a database for biometric information of a user at the electronic device 100. For example, the operations may be a process wherein biometric information of a user who wishes to subscribe to a service related to the electronic device 100 is transmitted to the electronic device 100 for user authentication later.

The operations from the operation S625 below may be a process of performing user authentication using biometric information.

When first biometric information is input at operation S625, the another electronic device 200 may generate first ID information by performing a first encryption process on the first biometric information and generate first password information by performing a second encryption process on the first biometric information at operation S630.

The another electronic device 200 may transmit the first ID information and the first password information to the electronic device 100 for user authentication at operation S635.

When the first ID information and the first password information are received from the another electronic device 200, the electronic device 100 may acquire at least one candidate ID information based on similarity between each stored ID information and the received first ID information at operation S640.

The electronic device 100 may compare each password information corresponding to the at least one candidate ID information with the first password information, for example, based on similarity between each password information corresponding to one candidate ID information and the first password information, identify one of the candidate IDs at operation S645.

The electronic device 100 may perform user authentication that the first ID information coincides with the identified ID information. For example, the electronic device 100 may determine the user of the first ID information as the user of the identified ID information.

The electronic device 100 may transmit user authentication information corresponding to the first ID information to the another electronic device 200 at operation S650.

Figure 7:
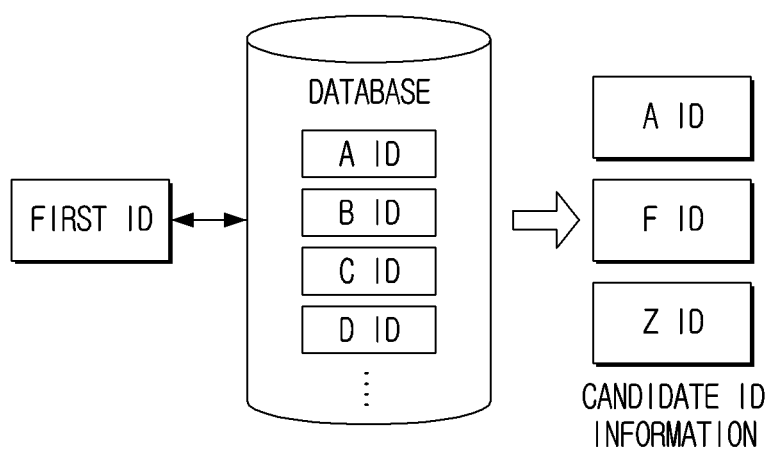
FIG. 7 is a diagram illustrating an example operation of acquiring candidate ID information according to an embodiment of the disclosure.

FIG. 7 is a diagram illustrating an example operation of acquiring candidate ID information according to an embodiment of the disclosure.

Explanation will be made based on a non-limiting example wherein first ID information and first password information are received from the another electronic device 200 for user authentication.

The electronic device 100 may acquire candidate ID information based on similarity between each ID information stored in a database and the first ID information. For example, from a database storing a plurality of pieces of ID information including A, B, C, and D IDs, A ID information, F ID information, and Z ID information may be acquired as candidate ID information.

Figure 8:
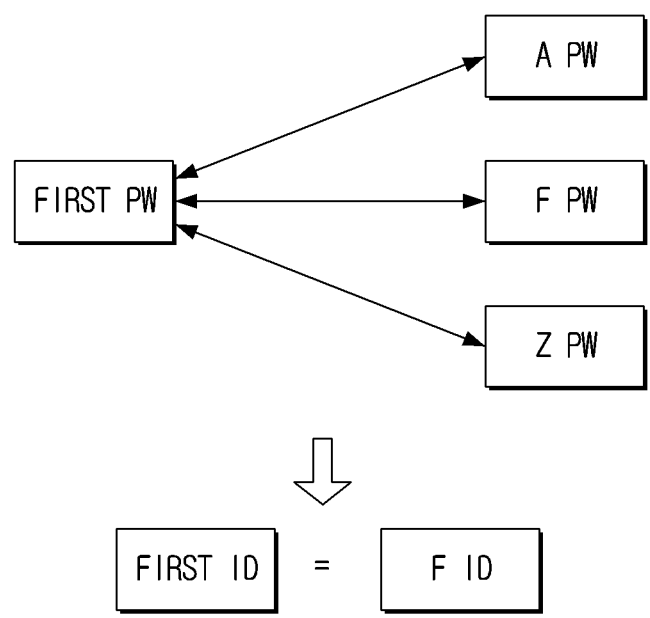
FIG. 8 is a diagram illustrating an example operation of identifying one of candidate ID information according to an embodiment of the disclosure.

FIG. 8 is a diagram illustrating an example operation of identifying one of candidate ID information according to an embodiment of the disclosure.

As in FIG. 7, a case wherein A ID information, F ID information, and Z ID information are acquired as candidate ID information is assumed for purposes of illustration.

For candidate ID information, each corresponding password information may be stored together in a database. For example, A ID information, F ID information, and Z ID information may respectively correspond to A password information, F password information, and Z password information.

The electronic device 100 may compare first password information corresponding to first ID information with A password information, F password information, and Z password information. Specifically, the electronic device 100 may identify one of A password information, F password information, and Z password information based on similarity with the first password information.

Similarity may be information related to a difference between password information consisting of listing of numbers.

For example, password information is assumed as follows.
 3333333333—first password information
 3333333553—A password information
 3333333533—F password information
 3333335553—Z password information In the first password information, the difference from the A password information is two digits, the difference from the F password information is one digit, and the difference from the Z password information is three digits.

In this case, the electronic device 100 may determine that the F ID corresponding to the F password of which difference from the first password information is minimum coincides with the first ID.

The electronic device 100 may transmit a result that the first ID coincides with the F ID to the another electronic device 200.

Figure 9:
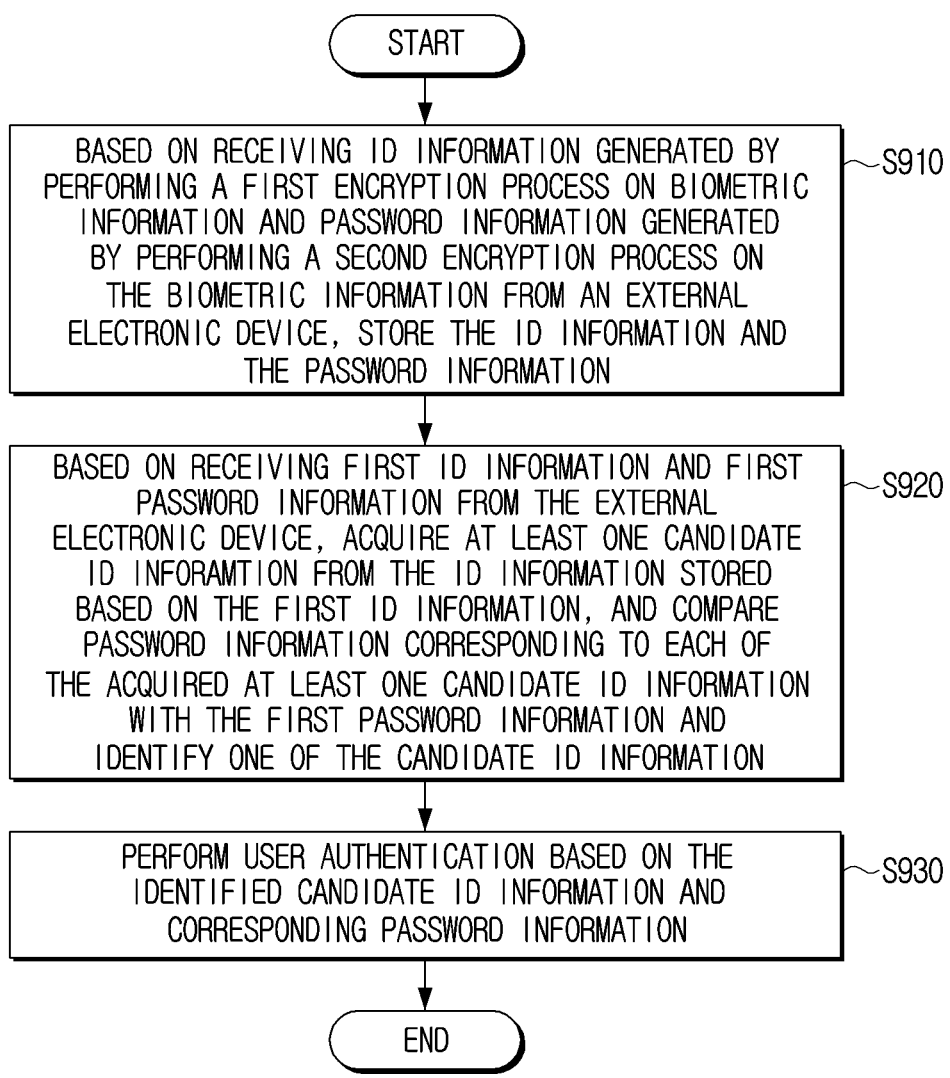
FIG. 9 is a flowchart illustrating an example method of controlling an electronic device according to an embodiment of the disclosure.

FIG. 9 is a flowchart illustrating an example method of controlling an electronic device according to an embodiment of the disclosure.

When ID information generated by performing a first encryption process on biometric information and password information generated by performing a second encryption process on the biometric information are received from the external electronic device 200, the electronic device 100 may store the ID information and the password information at operation S910.

The first encryption may be encryption based on a bio hash, and the second encryption may be encryption based on inner-product encryption (IPE).

The biometric information may include at least one of a user's fingerprint, iris, retina, vein, voice, or face shape.

When first ID information and first password information are received from the external electronic device 200, the electronic device 100 may acquire at least one candidate ID information from the stored ID information based on the first ID information, and compare password information corresponding to each of the acquired at least one candidate ID information with the first password information and identify one of the candidate ID information at operation S920.

For example, the electronic device 100 may acquire at least one candidate ID information based on similarity between each stored ID information and the first ID information, and identify one of the candidate ID information based on similarity between each password information corresponding to the at least one candidate ID information and the first password information.

Each of the ID information, the first ID information, the password information, and the first password information is encrypted numerical information. Also, the electronic device 100 may identify ID information of which difference value from the first ID information is less than or equal to a first threshold among the stored ID information as the candidate ID, and identify password information of which difference value from the first password information is less than or equal to a second threshold among password information corresponding to the candidate ID information.

The first threshold may be a value based on a Hamming distance, and the first threshold may be a value greater than the second threshold.

The electronic device 100 may acquire the at least one candidate ID information based on the first ID information without a decryption process for the received first ID information, and compare password information corresponding to each of the at least one candidate ID information with the first password information without a decryption process for the first password information. That is, the electronic device 100 may compare only a bit value corresponding to ID information with a bit value corresponding to the first ID information without a separate decryption process and acquire candidate ID information. Thus, according to an embodiment of the disclosure, candidate ID information can be acquired faster than the case of comparing ID information through decryption, and for the same reason, password information similar to the first password information can be identified faster than the case of comparing password information through decryption. Also, as decryption processing for ID information and password information is not performed, the risk of exposure of biometric information can be reduced.

The electronic device 100 may perform user authentication based on the identified candidate ID information and corresponding password information at operation S930.

The electronic device 100 may perform user authentication based on the identified password information and corresponding candidate ID information. Specifically, the electronic device 100 may perform user authentication based on password information of which difference value is minimum among password information of which difference value from the first password information is less than or equal to the second threshold and corresponding candidate ID information.

As detailed operations in each operation were described above, detailed explanation may not be repeated here.

Figure 10:
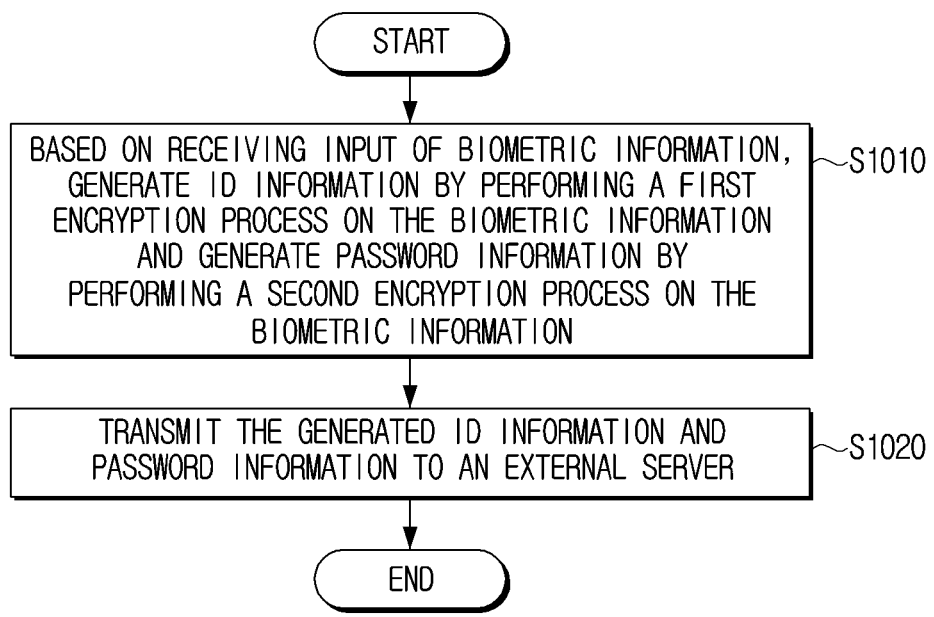
FIG. 10 is a flowchart illustrating an example method of controlling another electronic device according to an embodiment of the disclosure.

FIG. 10 is a flowchart illustrating an example method of controlling another electronic device according to an embodiment of the disclosure.

When biometric information is input, the another electronic device 200 may generate ID information by performing a first encryption process on the biometric information and generate password information by performing a second encryption process on the biometric information at operation S1010.

The first encryption may be encryption based on a bio hash, and the second encryption may be encryption based on inner-product encryption (IPE).

The biometric information may include at least one of a user's fingerprint, iris, retina, vein, voice, or face shape.

The another electronic device 200 may transmit the generated ID information and password information to the external server 100 at operation S1020.

As detailed operations in each step were described above, detailed explanation may not be repeated here.

Methods according to the aforementioned various embodiments of the disclosure may be implemented in the form of applications that can be installed on conventional electronic devices.

Methods according to the aforementioned various embodiments of the disclosure may be implemented with software upgrade, or hardware upgrade of conventional electronic devices.

In addition, methods according to the aforementioned various embodiments of the disclosure may be performed through an embedded server provided on an electronic device, or at least one external server of an electronic device.

According to an embodiment of the disclosure, the aforementioned various embodiments of the disclosure may be implemented as software including instructions stored in machine-readable storage media, which can be read by machines (e.g.: computers). The machines refer to devices that call instructions stored in a storage medium, and can operate according to the called instructions, and the devices may include an electronic device according to the aforementioned embodiments. In case an instruction is executed by a processor, the processor may perform a function corresponding to the instruction by itself, or using other components under its control. An instruction may include a code generated by a compiler or a code executable by an interpreter. A storage medium that is readable by machines may be provided in the form of a non-transitory storage medium. Here, the 'non-transitory' storage medium may not include signals, and is tangible, but does not indicate whether data is stored in the storage medium semi-permanently or temporarily.

According to an embodiment of the disclosure, methods according to the aforementioned various embodiments of the disclosure may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, according to an embodiment of the disclosure, the aforementioned various embodiments of the disclosure may be implemented in a computer or a recording medium that can be read by a device similar to a computer using software, hardware or a combination thereof. In some cases, the embodiments described in this specification may be implemented as a processor itself. Meanwhile, according to implementation by software, the embodiments such as procedures and functions described in this specification may be implemented as separate software modules. Each of the software modules may perform one or more functions and operations described in this specification.

Computer instructions for performing processing operations of devices according to the aforementioned various embodiments of the disclosure may be stored in a non-transitory computer-readable medium. When computer instructions stored in such a non-transitory computer-readable medium are executed by the processor of a specific device, processing operations at devices according to the aforementioned various embodiments are made to be performed by the specific device.

A non-transitory computer-readable medium may refer, for example, to a medium that stores data semi-permanently, and is readable by machines. As examples of a non-transitory computer-readable medium, there may be a CD, a DVD, a hard disc, a blue-ray disc, a USB, a memory card, a ROM and the like.

Also, each of the components according to the aforementioned various embodiments (e.g.: a module or a program) may consist of a singular object or a plurality of objects. In addition, among the aforementioned corresponding sub components, some sub components may be omitted, or other sub components may be further included in the various embodiments. Generally or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order, or omitted, or other operations may be added.

While various example embodiments of the disclosure have been illustrated and described, the disclosure is not limited to the aforementioned example embodiments, and it is apparent that various modifications can be made by those having ordinary skill in the art to which the disclosure belongs, without departing from the gist of the disclosure as set forth, for example, in the appended claims.

What is claimed is:

1. An electronic device comprising:
   a communication interface including circuitry;
   a memory configured to store identification (ID) information and password information corresponding to each ID information, wherein each ID information and corresponding password information are generated by respectively performing a first encryption process and a second encryption process different from the first encryption process on a same piece of user biometric information; and
   a processor configured to control the electronic device to:
   receive, via the communication interface, from an external electronic device, first ID information and corresponding first password information,
   identify, from among the ID information stored in the memory, at least one candidate ID information having a difference value from the first ID information less than or equal to a first threshold among the ID information stored in the memory,
   identify one of the candidate ID information based on identifying password information having a lowest difference value from the first password information among password information corresponding to the at least one candidate ID information, and
   perform user authentication based on the identified candidate ID information and the password information corresponding to the identified candidate ID information,
   wherein each of the ID information, the first ID information, the password information, and the first password information includes encrypted numerical information.

2. The electronic device of claim 1,
   wherein the first threshold is a value based on a Hamming distance, and
   the first threshold is a value greater than the second threshold.

3. The electronic device of claim 1,
   wherein the first encryption process is based on a bio hash, and
   the second encryption process is based on inner-product encryption (IPE).

4. The electronic device of claim 1,
   wherein the user biometric information includes at least one of a fingerprint, iris, retina, vein, voice, or face shape.

5. The electronic device of claim 1,
   wherein the processor is configured to control the electronic device to:
   identify the at least one candidate ID information based on the first ID information without decrypting the received first ID information, and compare password information corresponding to each of the at least one candidate ID information with the first password information without decrypting the first password information.

6. A method of controlling an electronic device, the method comprising:
   storing, in a memory of the electronic device, identification (ID) information and password information corresponding to each ID information, wherein each ID information and corresponding password information result from a first encryption process and a second encryption process different from the first encryption process respectively performed on a same piece of user biometric information;
   receiving, via a communication interface of the electronic device, from an external electronic device, first ID information and corresponding first password information,
   identifying, from among the ID information stored in the memory, at least one candidate ID information having a difference value from the first ID information less than or equal to a first threshold among the ID information stored in the memory,
   identifying one of the candidate ID information based on identifying password information having a lowest difference value from the first password information among password information corresponding to the at least one candidate ID information, and
   performing user authentication based on the identified candidate ID information and the password information corresponding to the identified candidate ID information,
   wherein each of the ID information, the first ID information, the password information, and the first password information includes encrypted numerical information.

7. The method of claim 6,
   wherein the first threshold is a value based on a Hamming distance, and
   the first threshold is a value greater than the second threshold.

8. The method of claim 6,
   wherein the first encryption process is based on a bio hash, and the second encryption process is based on inner-product encryption (IPE).

9. The method of claim 6, wherein the user biometric information includes at least one of a fingerprint, iris, retina, vein, voice, or face shape.

10. The method of claim 6, further comprising:

identifying the at least one candidate ID information based on the first ID information without decrypting the received first ID information, and comparing password information corresponding to each of the at least one candidate ID information with the first password information without decrypting the first password information.

* * * * *